United States Patent
Bush et al.

(10) Patent No.: US 12,404,949 B2
(45) Date of Patent: *Sep. 2, 2025

(54) RIGID PISTON FOR USE IN A FLUSH VALVE

(71) Applicant: SDB IP Holdings, LLC, Oviedo, FL (US)

(72) Inventors: Shawn D. Bush, Winter Park, FL (US); Ryan W. Nottage, Marietta, GA (US)

(73) Assignee: SDB IP Holdings, LLC, Oviedo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,470

(22) Filed: Dec. 18, 2023

(65) Prior Publication Data

US 2024/0117893 A1   Apr. 11, 2024

Related U.S. Application Data

(60) Continuation of application No. 17/348,272, filed on Jun. 15, 2021, now Pat. No. 11,885,432, which is a continuation of application No. 16/809,841, filed on Mar. 5, 2020, now Pat. No. 11,060,630, which is a division of application No. 15/799,084, filed on Oct. 31, 2017, now Pat. No. 10,619,754, which is a continuation of application No. 15/273,066, filed on Sep. 22, 2016, now Pat. No. 9,822,896, which is a continuation of application No. 14/955,567, filed on Dec. 1, 2015, now Pat. No. 9,481,989, which is a continuation of application No. 13/866,550, filed on Apr. 19, 2013, now Pat. No. 9,228,662.

(60) Provisional application No. 61/636,174, filed on Apr. 20, 2012.

(51) Int. Cl.
| | |
|---|---|
| *F16K 31/40* | (2006.01) |
| *E03D 3/04* | (2006.01) |
| *E03D 5/10* | (2006.01) |
| *F16K 31/383* | (2006.01) |

(52) U.S. Cl.
CPC .............. *F16K 31/406* (2013.01); *E03D 3/04* (2013.01); *E03D 5/10* (2013.01); *F16K 31/3835* (2013.01); *Y10T 29/49407* (2015.01)

(58) Field of Classification Search
CPC ................................ F16K 31/406; E03D 3/04
See application file for complete search history.

(56) References Cited

U.S. PATENT DOCUMENTS

| | | | |
|---|---|---|---|
| 1,494,708 A | 5/1924 | Reznicek |
| 1,520,892 A | 12/1924 | Steensen |
| 1,543,988 A | 6/1925 | Davis |
| 1,573,092 A | 2/1926 | Russell |
| 1,714,573 A | 5/1929 | Sloan |
| 1,756,263 A | 4/1930 | Sloan |
| 1,830,005 A | 11/1931 | Sloan |

(Continued)

FOREIGN PATENT DOCUMENTS

WO   02084035 A1   10/2002

*Primary Examiner* — Umashankar Venkatesan
(74) *Attorney, Agent, or Firm* — The Webb Law Firm

(57) ABSTRACT

A rigid piston assembly for use in a conventional flush valve includes a rigid piston and a solenoid configured to fixedly engage within the valve body. A flush valve for a plumbing fixture as well as a method of retrofitting a piston valve into a diaphragm flush valve body which includes a rigid piston and solenoid configuration.

12 Claims, 12 Drawing Sheets

(56) References Cited

U.S. PATENT DOCUMENTS

| | | | |
|---|---|---|---|
| 1,868,591 A | 7/1932 | Tanner | |
| 1,878,001 A | 9/1932 | Sloan | |
| 1,964,111 A | 6/1934 | Dobrick | |
| 2,007,652 A | 7/1935 | Kocour | |
| 2,024,270 A | 12/1935 | Binnall | |
| 2,066,086 A | 12/1936 | Wilson | |
| 2,074,698 A | 3/1937 | Langdon | |
| 2,153,904 A | 4/1939 | Wilson | |
| RE21,323 E * | 1/1940 | Langdon | E03D 3/04 137/853 |
| 2,406,259 A | 8/1946 | Russell et al. | |
| 2,872,150 A | 2/1959 | Philippe | |
| 2,916,251 A | 12/1959 | Butts | |
| 4,202,525 A | 5/1980 | Govaer et al. | |
| 4,261,545 A | 4/1981 | Allen | |
| 4,327,891 A | 5/1982 | Allen et al. | |
| 4,793,588 A | 12/1988 | Laverty, Jr. | |
| 4,987,920 A | 1/1991 | Donner | |
| 5,169,118 A | 12/1992 | Whiteside | |
| 5,195,720 A | 3/1993 | Nortier et al. | |
| 5,213,305 A | 5/1993 | Whiteside et al. | |
| 5,232,194 A | 8/1993 | Saadi et al. | |
| 5,269,333 A | 12/1993 | Richmond | |
| 5,271,600 A | 12/1993 | Saadi et al. | |
| 5,415,374 A | 5/1995 | Carroll et al. | |
| 5,476,244 A | 12/1995 | Carroll et al. | |
| 6,019,343 A | 2/2000 | Tsai | |
| 6,382,586 B1 | 5/2002 | Wilson et al. | |
| 6,408,873 B1 | 6/2002 | Hall et al. | |
| 6,926,247 B2 | 8/2005 | Nortier | |
| 6,959,905 B2 | 11/2005 | Bush | |
| 6,966,536 B2 | 11/2005 | Enomoto et al. | |
| 7,028,975 B2 | 4/2006 | Lee et al. | |
| 7,487,950 B2 | 2/2009 | Johnson | |
| 9,228,662 B2 | 1/2016 | Bush et al. | |
| 9,481,989 B2 | 11/2016 | Bush et al. | |
| 10,619,754 B2 | 4/2020 | Bush et al. | |
| 2001/0032947 A1 | 10/2001 | Freisinger et al. | |
| 2003/0020032 A1 | 1/2003 | Nortier | |
| 2004/0056223 A1 | 3/2004 | Wilson et al. | |
| 2004/0164261 A1 | 8/2004 | Parsons et al. | |
| 2004/0232370 A1 | 11/2004 | Parsons et al. | |
| 2007/0272887 A1 | 11/2007 | Carroll et al. | |
| 2008/0078014 A1 | 4/2008 | Wilson et al. | |
| 2009/0039299 A1 | 2/2009 | Wilson | |
| 2009/0072177 A1 | 3/2009 | O'Connor | |
| 2011/0037011 A1 | 2/2011 | Maercovich et al. | |
| 2011/0155934 A1 | 6/2011 | Guler et al. | |

* cited by examiner

FIG.5C

RIGID PISTON FOR USE IN A FLUSH VALVE

CROSS-REFERENCE TO RELATED APPLICATIONS

This application is a continuation application of U.S. patent application Ser. No. 17/348,272 filed Jun. 15, 2021, which is a continuation application of U.S. patent application Ser. No. 16/809,841 filed Mar. 5, 2020 (now U.S. Pat. No. 11,060,630), which is a divisional application of U.S. patent application Ser. No. 15/799,084 filed Oct. 31, 2017 (now U.S. Pat. No. 10,619,754), which is a continuation of U.S. patent application Ser. No. 15/273,066, filed Sep. 22, 2016 (now U.S. Pat. No. 9,822,896), which is a continuation of U.S. patent application Ser. No. 14/955,567, filed Dec. 1, 2015 (now U.S. Pat. No. 9,481,989), which is a continuation of U.S. patent application Ser. No. 13/866,550, filed Apr. 19, 2013 (now U.S. Pat. No. 9,228,662), which claims the benefit of U.S. Provisional Patent Application No. 61/636,174 filed on Apr. 20, 2012, the entire disclosures of each of which are hereby incorporated herein by reference in their entirety.

BACKGROUND OF THE INVENTION

Field of the Invention

The present invention relates generally to flush valves and, in particular, to a rigid piston with a solenoid for use in a flush valve.

Description of Related Art

Valves are used throughout many fluid transfer systems and in various applications, such as in the transfer and control of water conduit systems, and, in particular, in connection with plumbing fixtures in both residential and commercial settings. For example, flush valves are typically used for control and operation of toilets, urinals, and the like, such that when a user actuates a handle, water flows through the flush valve into a basin portion and out the drain.

A common type of flush valve is a diaphragm flush valve. Such a diaphragm flush valve is disclosed in U.S. Pat. No. 4,327,891 to Allen et al., herein incorporated by reference. The Allen patent discloses the use of a diaphragm in a flush valve, where the diaphragm is made of molded rubber and serves to effectuate the flow of water from a water inlet, through the valve, and to a water outlet. Further, the Allen patent sets forth various components and sub-components of a conventional flush valve.

Such diaphragm flush valves have several drawbacks. For example, the relatively small by-pass orifice positioned in the diaphragm can become clogged with debris, which prevents water from flowing into an upper chamber located in the flush valve. This causes the flush valve to remain open, resulting in constant water flow. In addition, the flushing cycle of the diaphragm flush valve takes approximately seven seconds to complete, depending upon the flow rates and pressure of the water entering the valve, due to the design of the diaphragm of the flush valve. Since an upper chamber fills slowly, the valve is slowly "shutting off". Therefore, a significant amount of water is wasted through the trap and sewer line during the sealing process of the valve. Yet another drawback is that conventional diaphragm flush valves are impacted at water pressures below 35 psi, since sealing of the valve based on the water pressure against the diaphragm is difficult with such lower water pressure. A need, therefore, exists for a valve replacement element that can effectively be retrofitted into a flush valve that does not have the drawbacks associated with conventional diaphragm flush valves. A further need exists for a flush valve having improved sealing features. Further still, it would be desirable to incorporate a solenoid into the flush valve for electronic operation.

SUMMARY OF THE INVENTION

In accordance with one embodiment, a rigid piston assembly is used as a replacement element in a flush valve having a valve body with a fluid inlet, a fluid outlet, an outer cover, and a handle member. The rigid piston assembly includes a rigid piston with a central opening and a by-pass orifice. The rigid piston is mounted within the valve body. The rigid piston can further include guide members that maintain the alignment of the rigid piston within the valve during operation as well as a flow ring that gauges the amount of water to be flushed during operation.

An adapter may be attached to the central opening of the rigid piston. A cap may be connected to the valve body at an end opposite the fluid outlet. The cap may have a hollow stem that extends from a central opening in the cap. The hollow stem can engage the adapter. A sealing component may be placed into the valve body forming a seal between the cap and the valve body.

A piston seal having a by-pass orifice can be fixedly engaged to the rigid piston and sealingly engaged to the valve body near an entrance of the fluid outlet. The piston seal can have an annular skirt that is adapted to extend out toward the cap and form a seal with the cap. The rigid piston assembly can also include a retaining ring having a by-pass orifice. The retaining ring can be fixedly engaged to the piston seal. The retaining ring can include a plurality of channels.

A by-pass device having a body with a first end, a second end, and a passageway located within the body can be placed through the by-pass orifices of the rigid piston, the piston seal, and the retaining ring, thereby establishing fluid communication between the fluid inlet and an upper chamber formed between the rigid piston and the cap. When the upper chamber is relieved of pressure, fluid from the fluid inlet forces the rigid piston to axially move in a direction opposite the fluid outlet permitting fluid flow through the fluid outlet.

The rigid piston assembly can further include a fitting having a first end and a second end. The first end of the fitting can be connected to the cap, and a solenoid can be connected to the second end. A flow restricting element can be used to control the flow of water. An infrared sensor and a radio frequency chip can also be used with the rigid piston assembly. Further, a cover may be attached to the opening previously occupied by a handle member.

In accordance with another embodiment, a method of retrofitting a rigid piston into a flush valve having a diaphragm assembly generally includes removing the outer cover from the valve body, removing the diaphragm valve assembly from the valve body, removing the handle member assembly, inserting a rigid piston into the valve body, incorporating an adapter into the rigid piston, attaching a cap to the valve body at an end opposite the fluid outlet, inserting a first end of a fitting into the cap, and attaching a solenoid to the second end of the fitting. The rigid piston includes a piston seal attached to a portion of the rigid piston and a by-pass device positioned inside by-pass orifices located in the rigid piston and the piston seal. The rigid piston can also include a retaining ring. The retaining ring can have a by-pass orifice and the by-pass device can also be adapted to fit inside the by-pass orifice of the retaining ring. A flow restricting element, infrared sensor, and/or radio frequency chip can also be incorporated into the flush valve. Further, a cover may be attached to the opening previously occupied by a handle member. The method can further include placing a sealing component between the cap and valve body.

In accordance with yet another embodiment, a flush valve for a plumbing fixture includes a fluid inlet in fluid communication with a fluid source, a fluid outlet in fluid communication with a plumbing fixture, a cap positioned at an end opposite the fluid outlet, a piston valve for regulating fluid flow between the fluid inlet and the fluid outlet, a fitting having a first end and a second end where the first end of the fitting is attached to the cap, and a solenoid connected to the second end of the fitting. The flush valve can also include an infrared sensor and a radio frequency chip.

The piston valve includes a rigid piston with a central opening and a by-pass orifice. The rigid piston can further include guide members that maintain the alignment of the rigid piston within the valve during operation as well as a flow ring that gauges the amount of water to be flushed during operation. An adapter may be attached to the central opening of the rigid piston.

A piston seal having a by-pass orifice is fixedly engaged to the rigid piston and sealingly engaged to the valve body near an entrance of the fluid outlet. The piston seal can have an annular skirt that is adapted to extend out toward the cap and form a seal with the cap. The flush valve can also include a retaining ring. The retaining ring can include a plurality of channels.

A by-pass device having a body with a first end, a second end, and a passageway located within the body can be positioned inside the by-pass orifices of the rigid piston, the piston seal, and the retaining ring. The flush valve can also include a sealing component that forms a seal between the cap and the valve body.

BRIEF DESCRIPTION OF THE DRAWINGS

FIG. 5C is a cross-sectional elevational view of the flush valve of FIG. 5A during a flushing event according to the present invention.

DESCRIPTION OF THE INVENTION

For purposes of the description hereinafter, spatial orientation terms, if used, shall relate to the referenced embodiment as it is oriented in the accompanying drawing figures or otherwise described in the following description. However, it is to be understood that the embodiments described hereinafter may assume many alternative variations and embodiments. It is also to be understood that the specific devices illustrated in the accompanying figures and described herein are simply exemplary and should not be considered as limiting.

Figure 1:
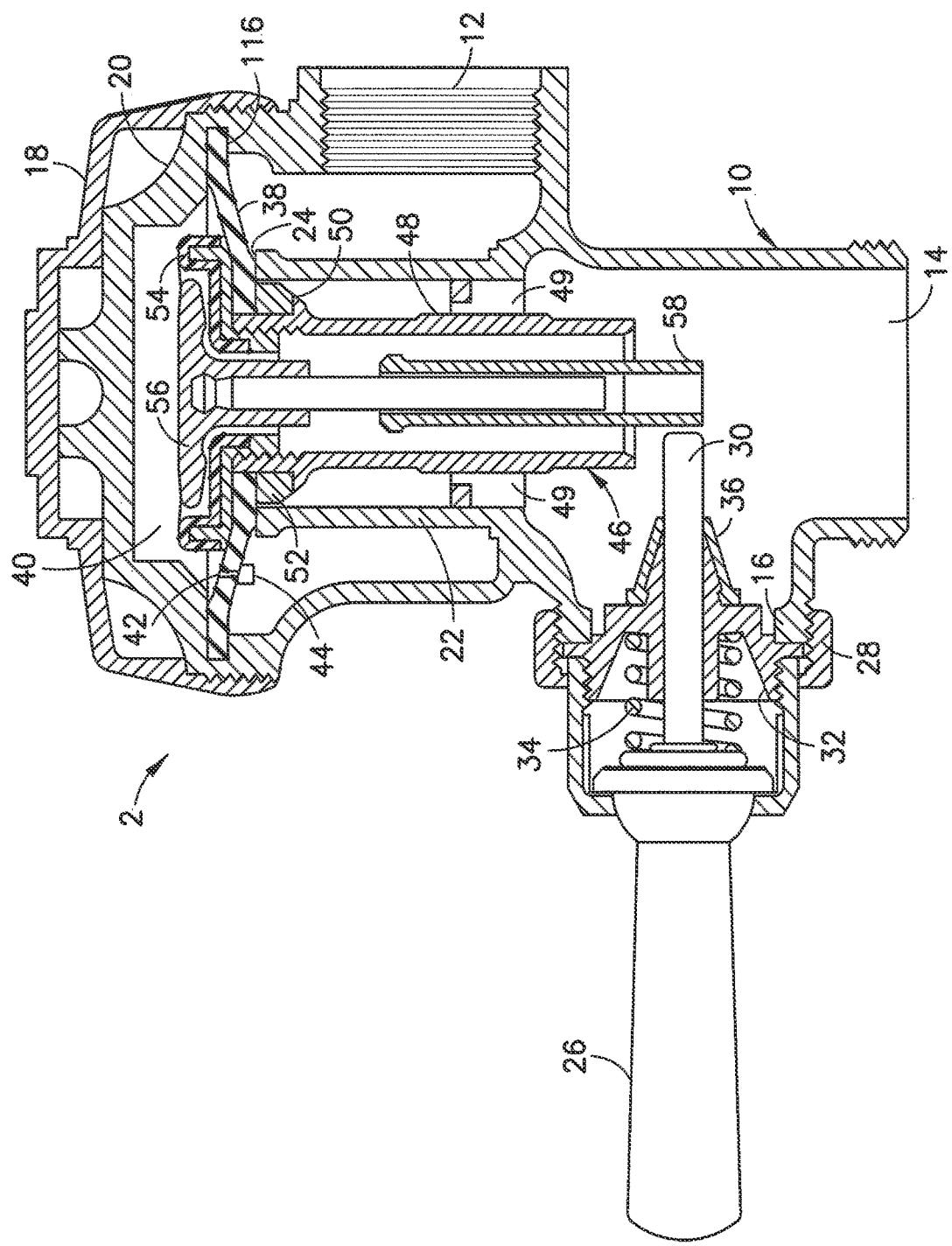
FIG. 1 is a cross-sectional elevational view of an assembled diaphragm flush valve according to the prior art.

As shown in FIG. 1, a conventional flush valve 2 has a general hollow valve body 10 which includes a fluid inlet 12, a fluid outlet 14, and a handle coupling connection 16. The top of the valve body 10 is closed by an outer cover 18 and an inner cover 20. The inlet portion of the valve is separated from the outlet portion by an outlet bore 22 which is attached to the inside of the valve body 10. A main valve seat 24 is formed on the top of the outlet bore 22.

The valve is actuated by an operating handle 26 which is fastened to the valve body 10 by means of a coupling nut 28. The handle 26 is connected to a plunger 30 which extends to the interior portion of the valve body 10. The plunger 30 is guided and supported by a bushing 32 and restored by a spring 34. A rubber sealing cap or packing 36 is snapped on the end of bushing 32 and prevents leakage outward from the handle opening.

The main valve seat 24 is normally closed by a flexible rubber diaphragm 38. The flexible rubber diaphragm 38 extends across the valve body 10 and defines an upper chamber 40. The flexible rubber diaphragm 38 includes a by-pass hole 42 which provides fluid communication between the inlet side of the valve and the upper chamber 40. A filter 44 may be provided thereover to prevent clogging of the by-pass hole 42.

The flexible rubber diaphragm 38 is attached at its outer edge to the valve body 10. The outer cover 18 clamps the flexible rubber diaphragm 38 to the valve body 10. The center of the flexible rubber diaphragm 38 has an opening which allows fluid communication between the upper chamber 40 and the fluid outlet 14. A relief valve shown generally at 46 is attached to the flexible rubber diaphragm 38 and normally closes the opening at the center of the flexible rubber diaphragm 38. The relief valve 46 includes a guide portion 48 having wings 49. The wings 49 fit closely against the inside diameter of the outlet bore 22. The guide portion 48 also has a lip 50. The lip 50 supports a collar 52. The relief valve 46 includes a clamping member 54 which is threadably engaged with the guide portion 48. The clamping member 54 clamps the inner edge of the flexible rubber diaphragm 38 between the clamping member 54 and the collar 52 to form a seal. The clamping member 54 has a hole in the middle which is normally closed by an auxiliary valve member 56. This auxiliary member 56 is connected to a depending stem 58 which extends to a point opposite the actuating plunger 30.

Figure 2:
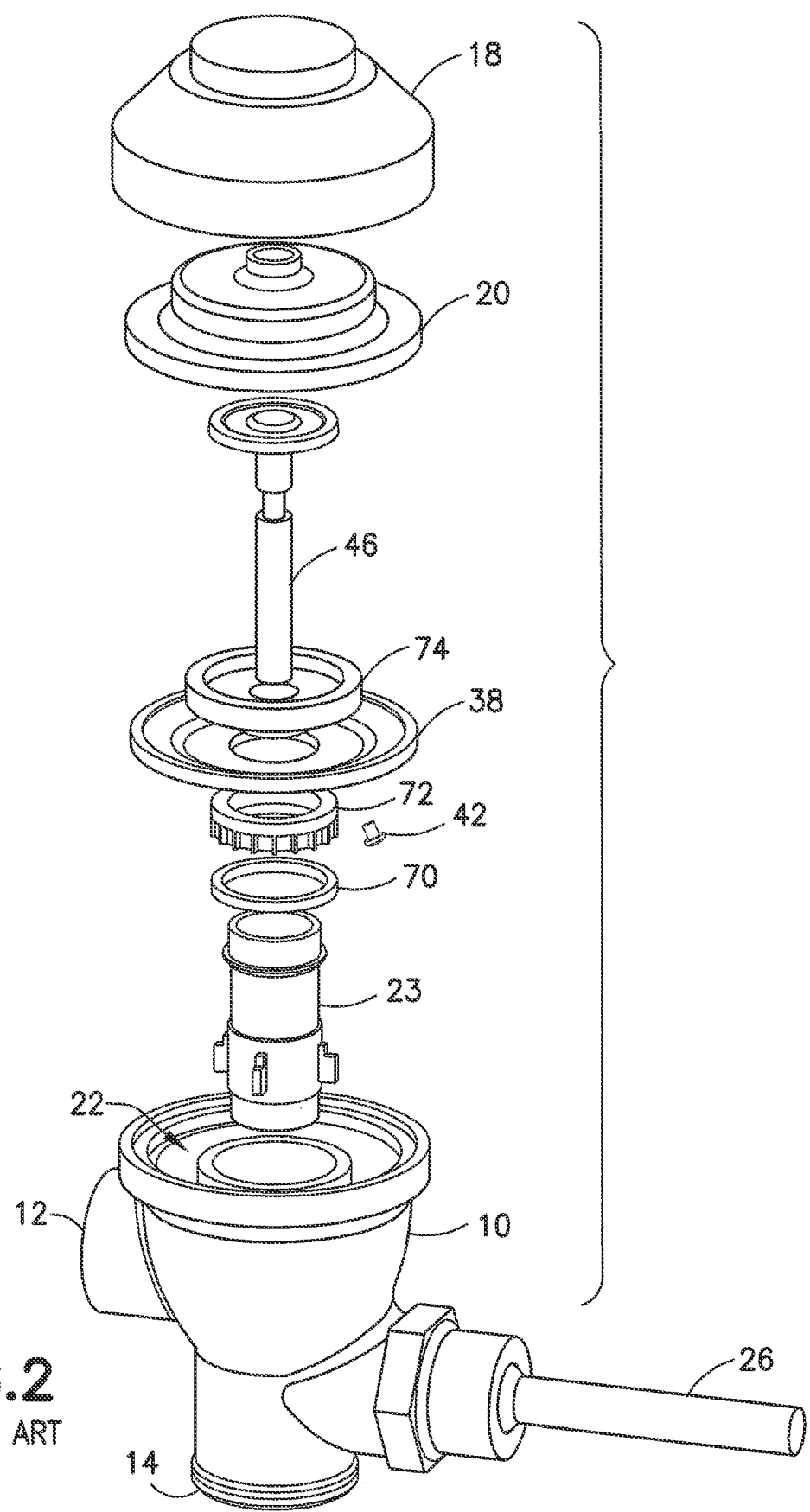
FIG. 2 is an exploded perspective view of the diaphragm flush valve according to FIG. 1.

Referring specifically to FIG. 2, a central throat 23 is first placed into the valve body 10. A guide ring 70 is placed around a top portion of the central throat 23, and a flow ring 72 is placed on top of the guide ring 70. The flexible rubber diaphragm 38 is then placed into the valve body 10. A by-pass hole 42 is positioned in the flexible rubber diaphragm 38 and a molded disc 74 is placed onto the flexible rubber diaphragm 38. The relief valve 46 is placed through openings located in the center of the molded disc 74 and flexible rubber diaphragm 38. An inner cover 20 is placed over the diaphragm assembly and an outer cover 18 is placed on top of the inner cover 20. As discussed in detail above, flush valves incorporating a flexible rubber diaphragm 38 have numerous drawbacks. Accordingly, the present invention is directed to a rigid piston 310 incorporating a solenoid 400, as shown in FIG. 3, for use in a conventional flush valve body 10.

Figure 3:
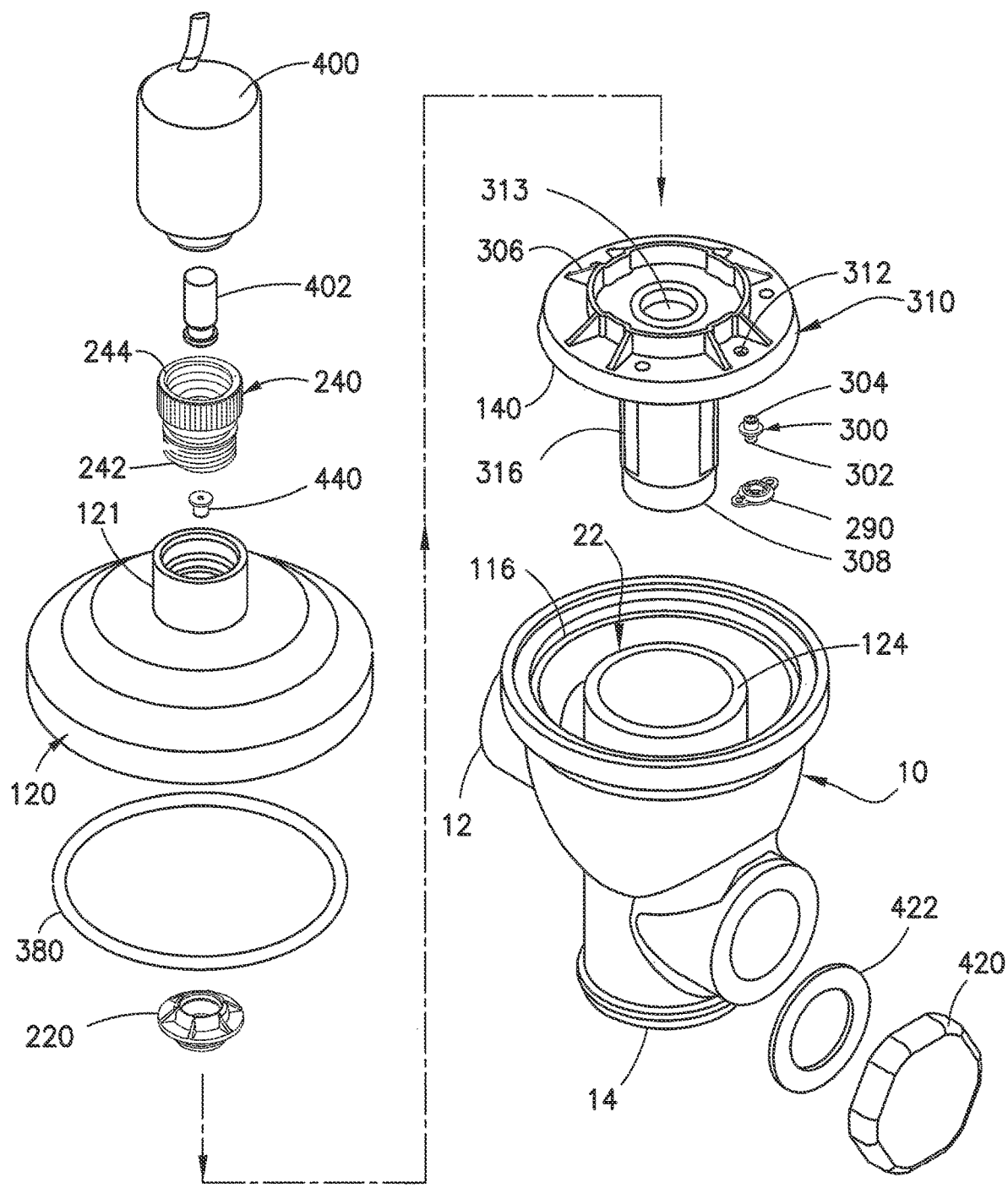
FIG. 3 is an exploded perspective view of one embodiment of a flush valve according to the present invention.
Figure 4:
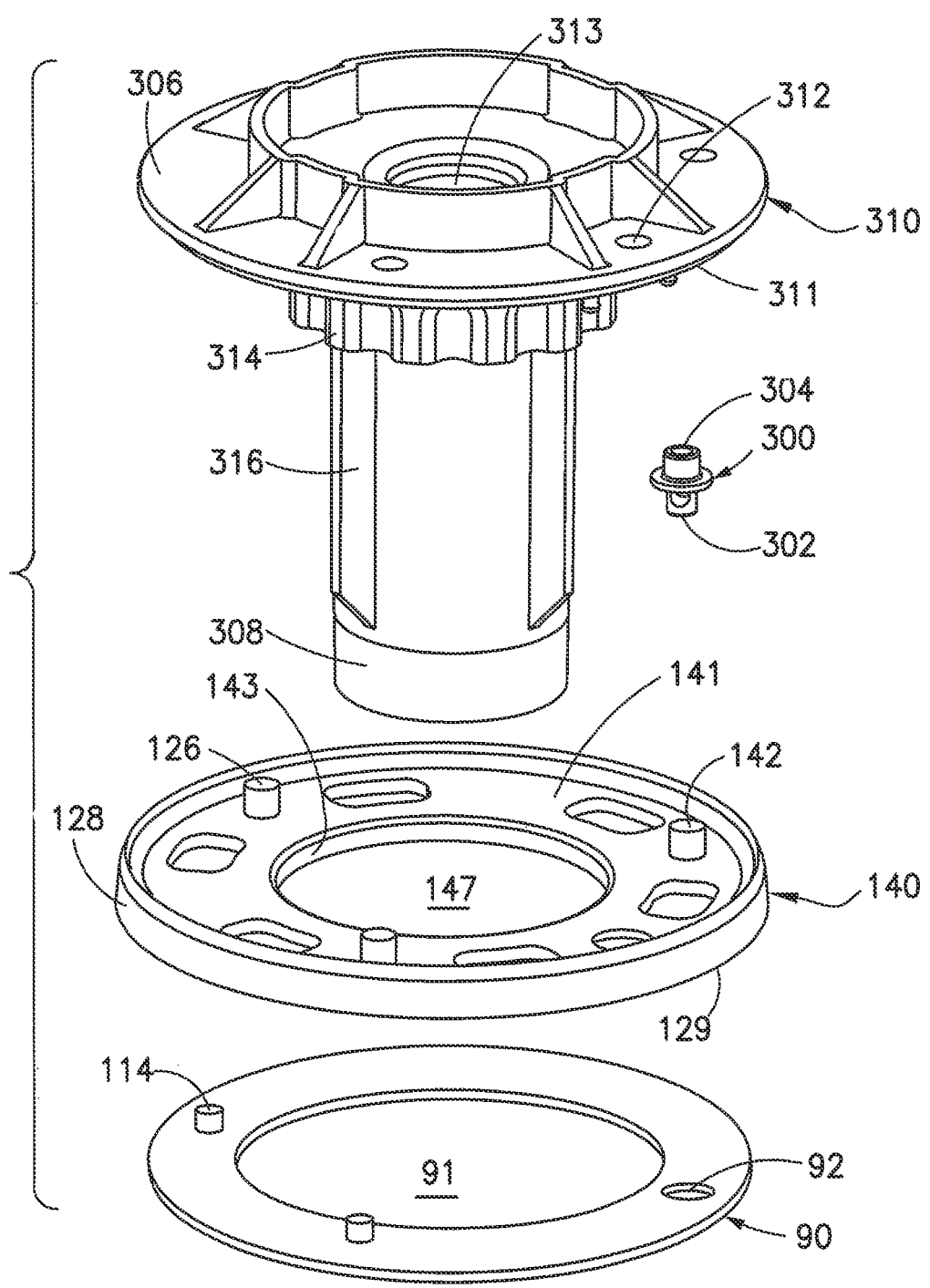
FIG. 4 is an exploded perspective view of one embodiment of a flush valve according to the present invention.

As shown in FIGS. 3-4, the present invention includes a rigid piston 310 having a disc shaped member 306 defining a central opening 313 therein and an elongated hollow member 308 that extends from the disc shaped member 306 of the rigid piston 310. The rigid piston 310 can also have a by-pass orifice 312 defined in the disc shaped member 306 of the rigid piston 310. The rigid piston 310 sits directly within the hollow valve body 10 providing a mechanism for regulating water flow through the valve body 10.

Figure 5A:
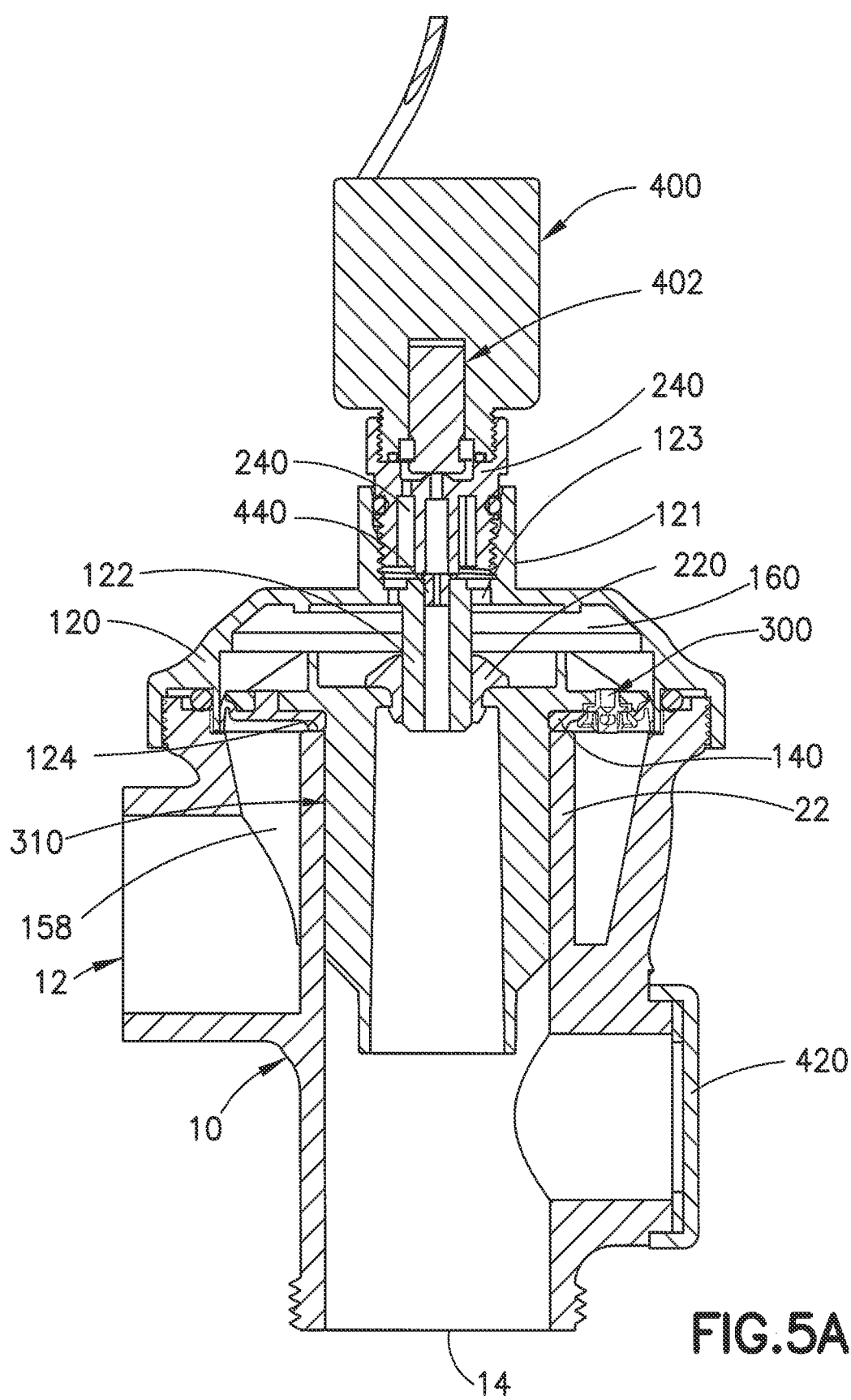
FIG. 5A is a cross-sectional elevational view of a flush valve in a non-activated state according to the present invention.

When placed into the valve body 10, the disc shaped member 306 of the rigid piston 310 sits on top of a central valve seat 124 of the outlet bore 22 and the elongated hollow member 308 extends down into the outlet bore 22. The disc shaped member 306 extends outward from the central seat 124 of the outlet bore 22 to an inside annular shoulder 116 of the valve body 10 creating a lower chamber 158 and an upper chamber 160, as shown in FIG. 5A. The lower chamber 158, located below the disc shaped member 306 of the rigid piston 310 near the fluid inlet 12, is defined between the rigid piston 310, outlet bore 22, and valve body 10. The upper chamber 160, located above the disc shaped member 306 of the rigid piston 310, is defined between the rigid piston 310, the valve body 10, and a cylindrical cap 120 that is attached to the valve body 10 at an end opposite the fluid outlet 14.

Figure 6:
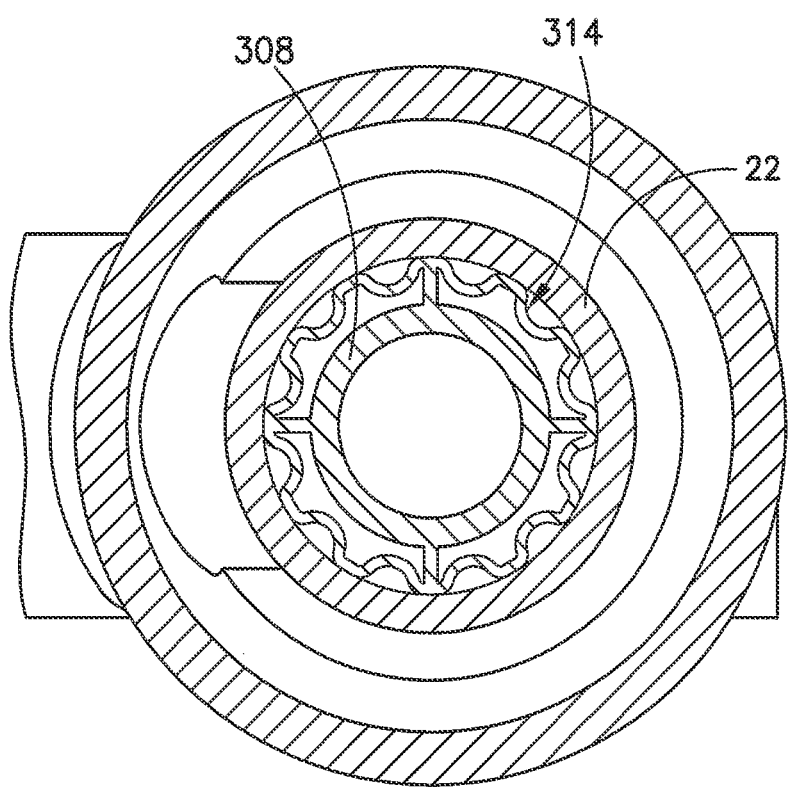
FIG. 6 is a cross-sectional bottom view of the flush valve according to the present invention.

The rigid piston 310 can have a scallop shaped flow ring 314 for maintaining a constant water flow area, such as shown in FIGS. 4 and 6. The flow ring 314 can be attached to the outer surface of the elongated hollow member 308 of the rigid piston 310. During flushing, water flows around the flow ring 314 as it enters the outlet bore 22. The flow ring 314 helps regulate the flow of water during flushing, which allows for a consistent turbulent flow of water during flushing when the rigid piston 310 is incorporated into the valve body 10. A consistent turbulent flow of water through the throat of a toilet helps ensure proper flushing with a sufficient amount of water. The flow ring 314 also ensures a high velocity of flush which allows for a quicker and more efficient flush.

Guide members 316 can also be attached to the elongated hollow member 308 of the rigid piston 310 (see FIGS. 3-4). The guide members 316 extend down the length of the elongated hollow member 308 of the rigid piston 310. When the rigid piston 310 is placed into the valve body 10, the guide members 316 abut the inside wall of the outlet bore 22 securing the elongated hollow member 308 of the rigid piston 310 within the valve body 10. The guide members 316 ride along the inside wall of the outlet bore 22 as the rigid piston 310 moves during operation. This prevents the rigid piston 310 from shifting during operation, thereby maintaining proper alignment of the rigid piston 310 within the valve body 10 at all times. In one embodiment, the flow ring 314 is also attached to the guide members 316.

Referring to FIGS. 3-4, a piston seal 140 can be attached to the rigid piston 310. As shown in FIG. 4, the piston seal 140 can have a central opening 147 for receiving the elongated hollow member 308 of the rigid piston 310. The piston seal 140 can also have a by-pass orifice 142. The piston seal 140 can be made of an elastomeric material such as rubber. The piston seal 140 is configured to fixedly engage with the rigid piston 310. For example, as shown in FIG. 4, an undersurface 311 of the disc shaped member 306 of the rigid piston 310 can be adapted to fixedly engage with a sealing surface 141 of the piston seal 140. In one embodiment, as shown in FIG. 4, the undersurface 311 of the disc shaped member 306 of the rigid piston 310 may define cavities and the piston seal 140 may include corresponding projections 126, such as barbed projections, that can be placed into the cavities of the rigid piston 310, thereby securing the piston seal 140 to the rigid piston 310. In certain embodiments, the piston seal 140 is molded to the rigid piston 310. The piston seal 140 can further have an annular skirt 128 that completely surrounds the outer edge of the piston seal 140 (See FIG. 4).

The piston seal 140 is sized and shaped to engage and form a seal with the valve body 10. In one embodiment, the piston seal 140 is designed to engage and form a first seal with the central valve seat 124 of the outlet bore 22 and a second seal with a cap 120 that is attached to the valve body 10 after the rigid piston 310 is inserted into the valve body 10. For instance, once the piston seal 140 is attached to the rigid piston 310, the rigid piston 310 and piston seal 140 can be placed into the valve body 10. A central sealing ring 143 extending from the piston seal 140 can be placed into the outlet bore 22 of the valve body 10 (see FIG. 4). This engagement forms a first seal around the central valve seat 124 of the outlet bore 22 shown in FIG. 3. This helps prevent water from leaking into the fluid outlet 14 from the fluid inlet 12.

The annular skirt 128 of the piston seal 140 can engage the inside of a cylindrical cap 120 that is attached to the valve body 10 at an end opposite the fluid outlet 14. For example, the annular skirt 128 may include a sealing edge 129 located at the bottom end of the annular skirt 128 shown in FIG. 4. As water flows through the fluid inlet 12 into the lower chamber 158 (see FIG. 5A), water pushes up on the piston seal 140. The pressure forces the annular skirt 128 surrounding the piston seal 140 to extend out toward the cylindrical cap 120 attached to the valve body 10. The sealing edge 129 of the annular skirt 128 contacts the inside of the cylindrical cap 120 and forms a seal between the piston seal 140 and the cylindrical cap 120. This second sealing engagement prevents water in the lower chamber 158 from leaking around the outer portion of the rigid piston 310 into the upper chamber 160.

The dual sealing arrangement described above makes it possible to form separate and distinct seals at two different areas in a flush valve body 10 at the same time with a single piston seal 140. The use of a single sealing member to form multiple sealing engagements in different areas at the same time, allows for an efficient sealing arrangement in a flush valve body 10. It also allows for an easy and fast installation process.

Referring to FIGS. 3-4, the piston assembly can further include a retaining ring 90, 290. In certain embodiments, as shown in FIG. 4, the retaining ring 90 includes a by-pass orifice 92 and a central opening 91 that can receive the elongated hollow member 308 of the rigid piston 310. Alternatively, as shown in FIG. 3, the retaining ring 290 is smaller in size and does not have a central opening 91 to receive the elongated hollow member 308 of the rigid piston 310. FIGS. 9-12 show enlarged images of the smaller retaining ring 290 that does not have a central opening 91 to receive the elongated hollow member 308 of the rigid piston 310. As shown in FIGS. 9-12, the smaller retaining ring 290 still contains the by-pass orifice 92.

Figure 13:
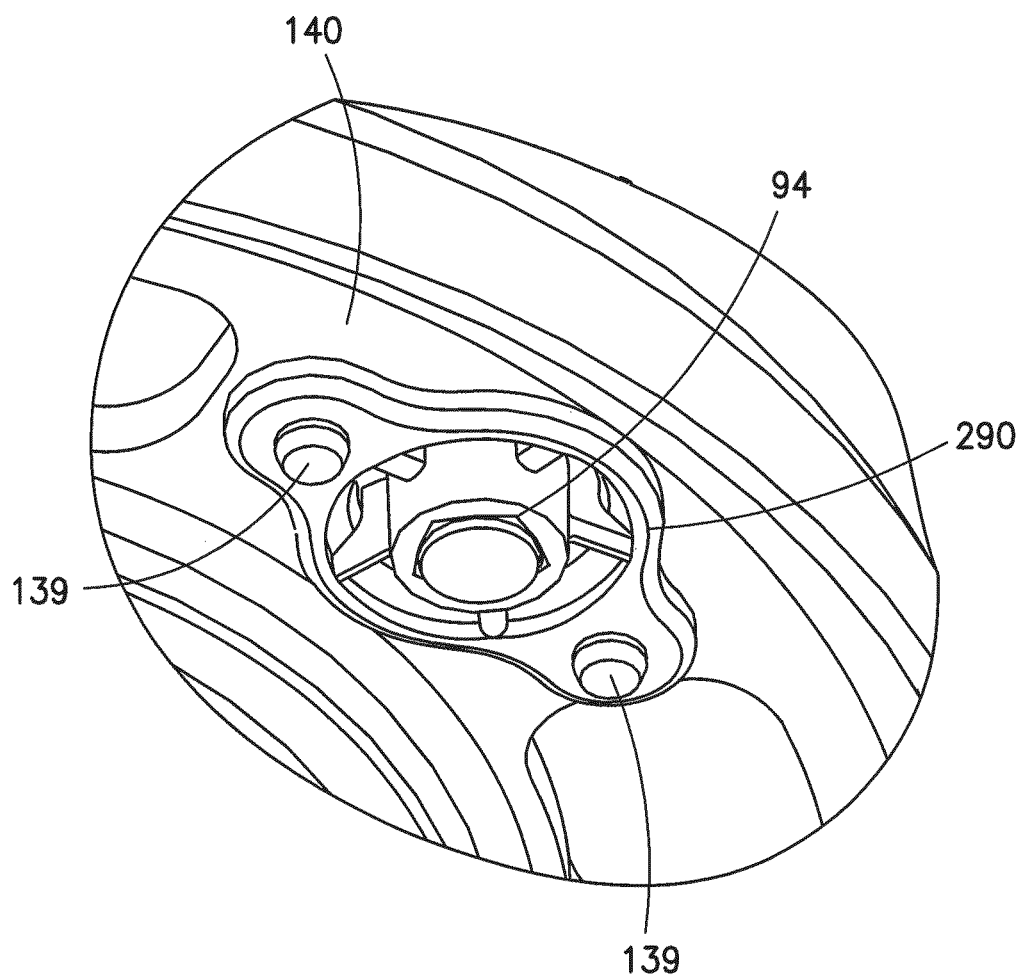
FIG. 13 is a bottom perspective view of retaining ring of FIG. 9 attached to a piston seal according to the present invention.

In certain embodiments, the retaining ring 90, 290 can be fixedly engaged to the piston seal 140. For example, in one embodiment shown in FIG. 4, the retaining ring 90 has a plurality of projections 114 that can be placed into corresponding cavities located in the piston seal 140, thereby securing the retaining ring 90 to the piston seal 140. Alternatively, as shown in FIG. 13, the piston seal 140 contains protrusions 139 that can be placed through receiving holes 291, as shown in FIGS. 9-12, in the retaining ring 290. Further, as shown in FIGS. 7 and 9-13, the retaining ring 90, 290 may include a plurality of channels 94 that are small in diameter, preventing large debris from entering the channels 94.

In accordance with one embodiment of the present invention, as shown in FIGS. 3-4, a by-pass device 300 can be placed through the by-pass orifices 312, 142 of the rigid piston 310 and the piston seal 140. The by-pass device 300 includes a body having a first end 302 and a second end 304 (see FIGS. 3-4). The second end 304 of the by-pass device 300 can be placed through the by-pass orifice 312 defined in the rigid piston 310, and the first end 302 of the by-pass device 300 can be placed through the by-pass orifice 142 defined in the piston seal 140. Referring to FIGS. 3-4, in certain embodiments, when a retaining ring 90, 290 is used, the first end 302 of the by-pass device 300 also can be placed through a by-pass orifice 92 defined in the retaining ring 90, 290.

Figure 8:
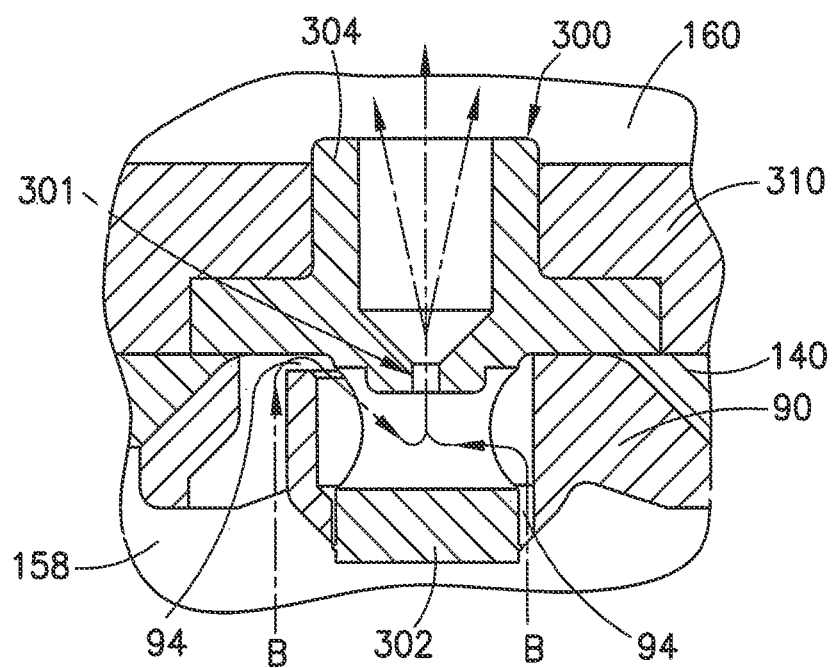
FIG. 8 is a cross-sectional elevational view of a by-pass device according to the present invention.
Figure 9:
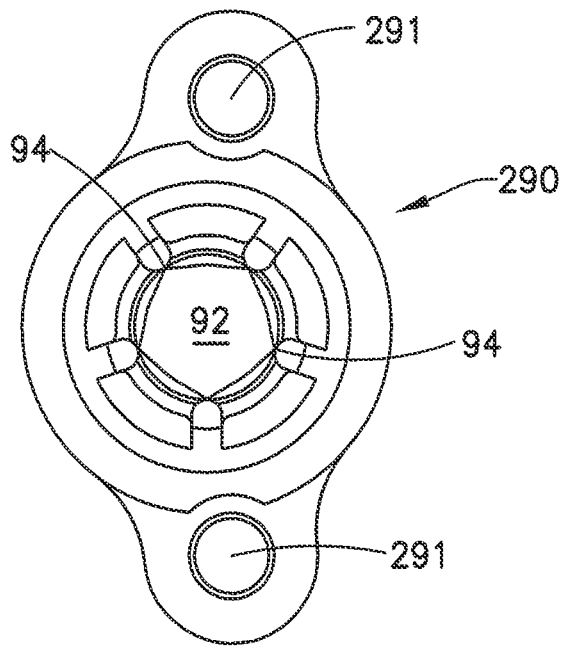
FIG. 9 is a top view of a retaining ring according to one embodiment of the present invention.
Figure 10:
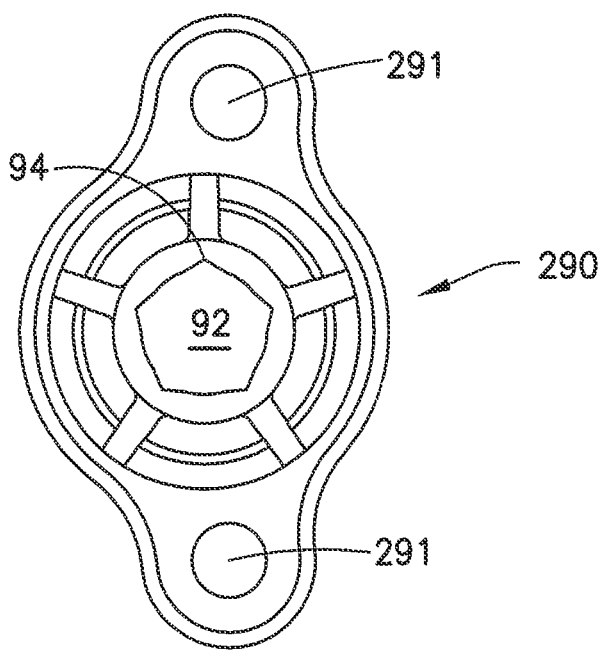
FIG. 10 is a bottom view of the retaining ring of FIG. 9 according to the present invention.
Figure 11:
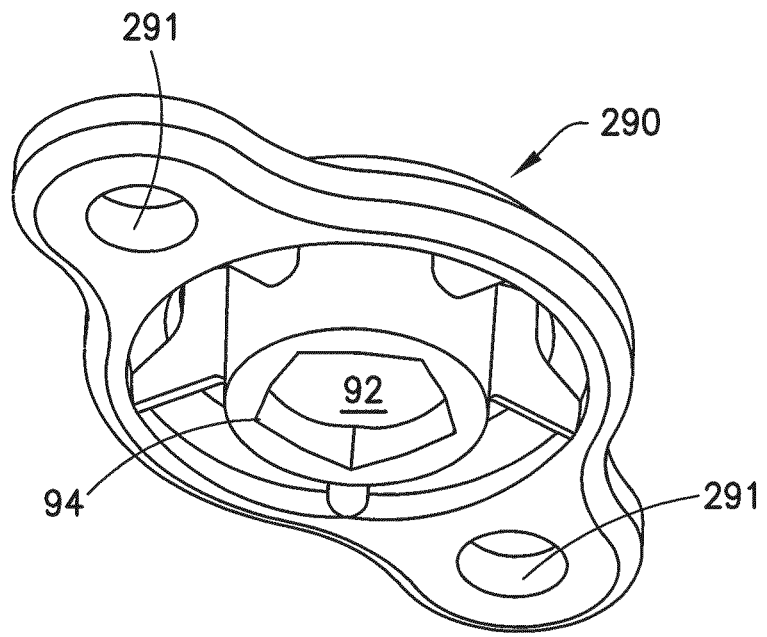
FIG. 11 is a bottom isometric view of the retaining ring of FIG. 9 according to the present invention.
Figure 12:
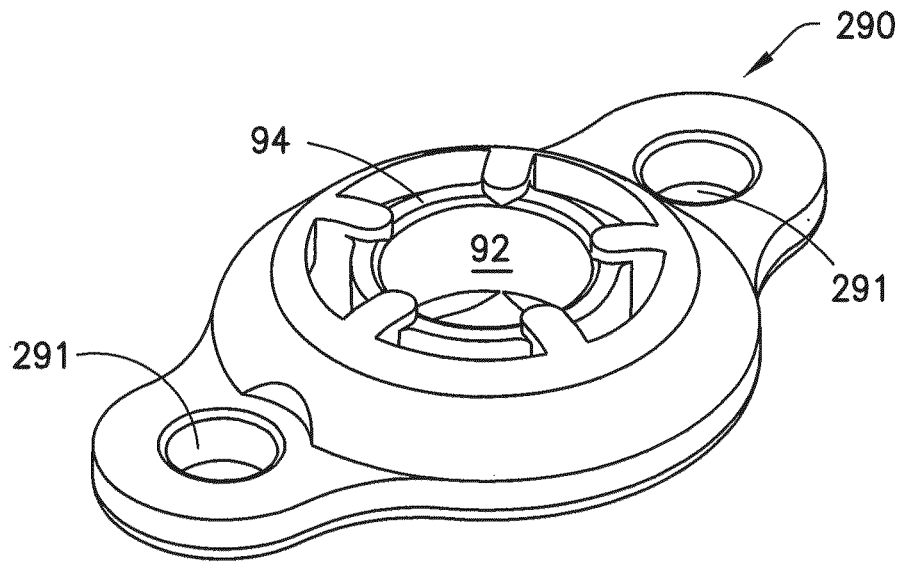
FIG. 12 is a top isometric view of the retaining ring of FIG. 9 according to the present invention.

As shown in FIG. 8, the by-pass device 300 further contains a passageway 301 formed within the body of the by-pass device 300. This passageway 301 connects the lower chamber 158 near the fluid inlet 12 to the upper chamber 160 located above the rigid piston 310. The passageway 301 of the by-pass device 300 is designed so that water can enter through at least one opening located near the first end 302 of the by-pass device 300. The water can then flow from the opening(s) located near the first end 302, through the passageway 301, and out an opening located at the second end 304 of the by-pass device 300. Reference letter "B" in FIG. 8 illustrates the flow of water from the lower chamber 158 to the upper chamber 160 by way of the passageway 301 of the by-pass device 300.

During assembly of one embodiment according to the present invention, the second end 304 of the by-pass device 300 is placed through the by-pass orifice 312 of the rigid piston 310. The piston seal 140 is attached to the rigid piston 310 with the first end 302 of the by-pass device 300 being placed through the by-pass orifice 142 of the piston seal 140. Once placed into the valve body 10, the piston seal 140 forms a seal with the central valve seat 124 of the outlet bore 22 and the cap 120 that is attached to the valve body 10 after the rigid piston 310 is placed into the valve body 10. This prevents water from entering the fluid outlet 14 and the upper chamber 160 as described above. As a result, water from the fluid inlet 12 can only enter the upper chamber 160 through the by-pass device 300.

Figure 7:
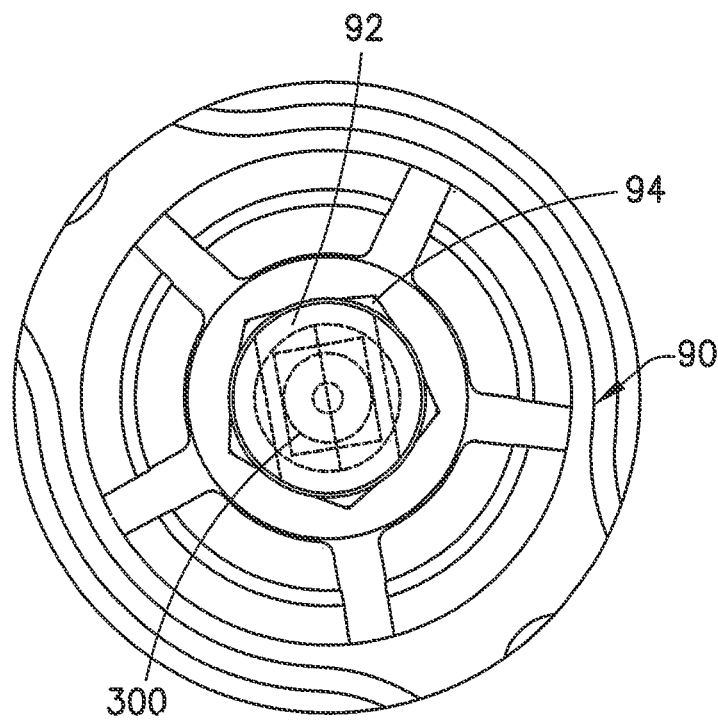
FIG. 7 is a bottom view of a retaining ring according to one embodiment of the present invention.

In certain embodiments, as shown in FIGS. 3-4, a retaining ring 90, 290 can be attached to the piston seal 140 and the first end 302 of the by-pass device 300 can be placed through the by-pass orifice 92 of the retaining ring 90, 290. FIG. 7 shows a bottom view of a by-pass device 300 being placed through the by-pass orifice of a retaining ring 90. As shown in FIG. 8, water flows through the channels 94 located in the retaining ring 90 and into the opening(s) located near the first end 302 of the by-pass device 300, which then flows out the second end 304 of the by-pass device 300 and into the upper chamber 160. The channels 94 are smaller in diameter than the passageway 301 of the by-pass device 300. This filters out large debris, thereby preventing clogging of the passageway 301 of the by-pass device 300.

Referring to FIG. 3, the present invention can further include an adapter 220 that can be positioned in the rigid piston 310 and extend into the elongated hollow member 308 of the rigid piston 310. As shown in FIG. 5A, the adapter 220 engages and forms a seal with the rigid piston 310 around the opening located in the center of the rigid piston 310. This seal prevents water in the upper chamber 160 from leaking between the adapter 220 and rigid piston 310 and into the fluid outlet 14. In certain embodiments, the adapter 220 is molded to the rigid piston 310.

Referring to FIG. 3, a cylindrical cap 120 is placed onto the valve body 10 after the rigid piston 310 and adapter 220 are installed into the flush valve body 10. The cylindrical cap 120 is placed onto the valve body 10 next to the rigid piston 310. The cap 120 can be made of any rigid material including various types of plastics and metals. In addition, the surface of the cap 120 contains the required lubricity to easily slide onto the valve body 10. Once inserted onto the valve body 10, the cylindrical cap 120 further secures the piston 310 in place and functions as a mechanism limiting the movement of the piston 310 to a consistently steady axial motion within the valve body 10.

A sealing component 380, such as an O-ring or gasket, can be positioned into the valve body 10 next to the rigid piston 310. When the cap 120 is inserted onto the valve body 10, pressure is applied to the sealing component 380 contained therein, thereby forming a tight seal between the valve body 10 and the cylindrical cap 120.

Figure 5B:
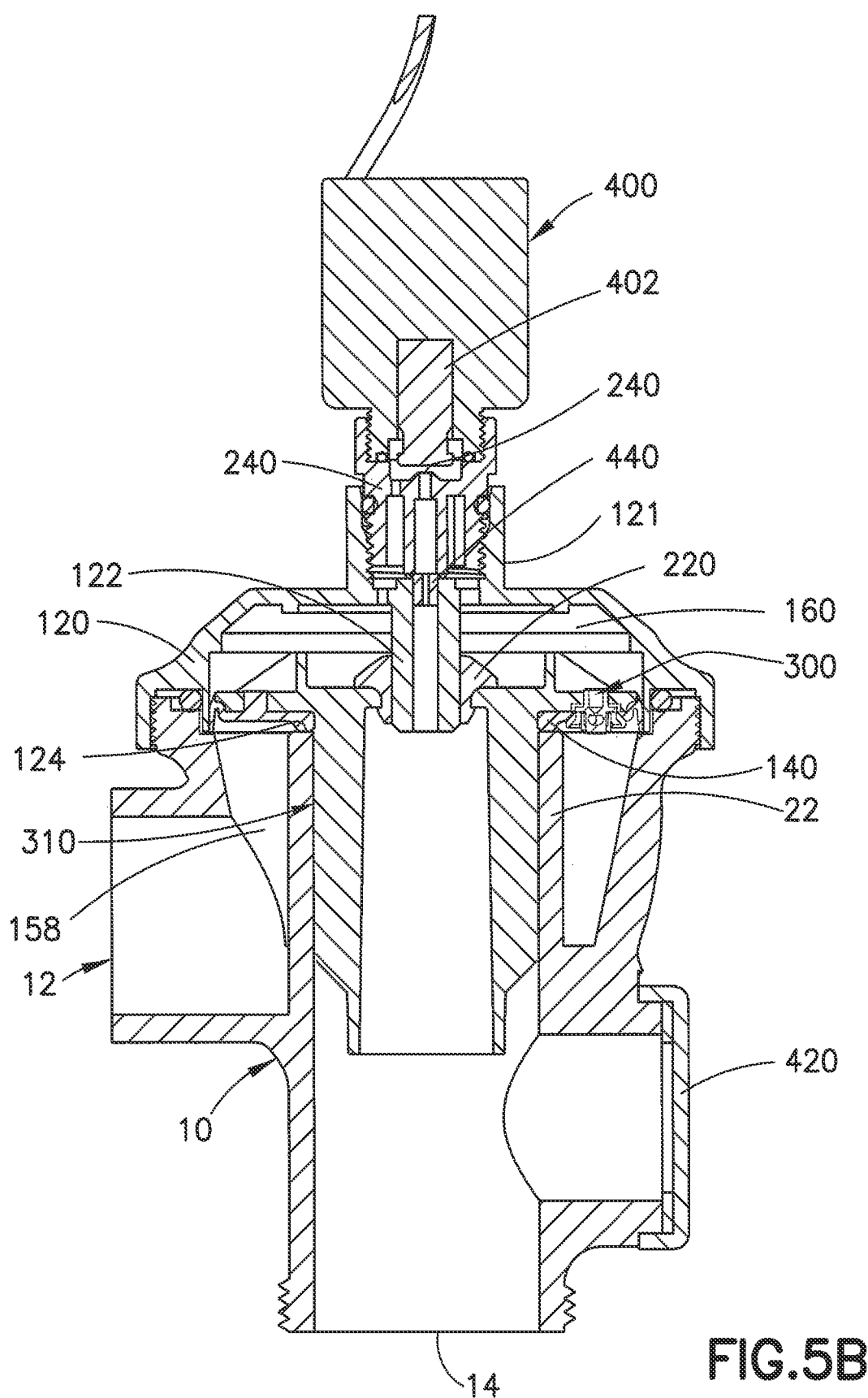
FIG. 5B is a cross-sectional elevational view of the flush valve of FIG. 5A in an activated state according to the present invention.
Figure 5C:
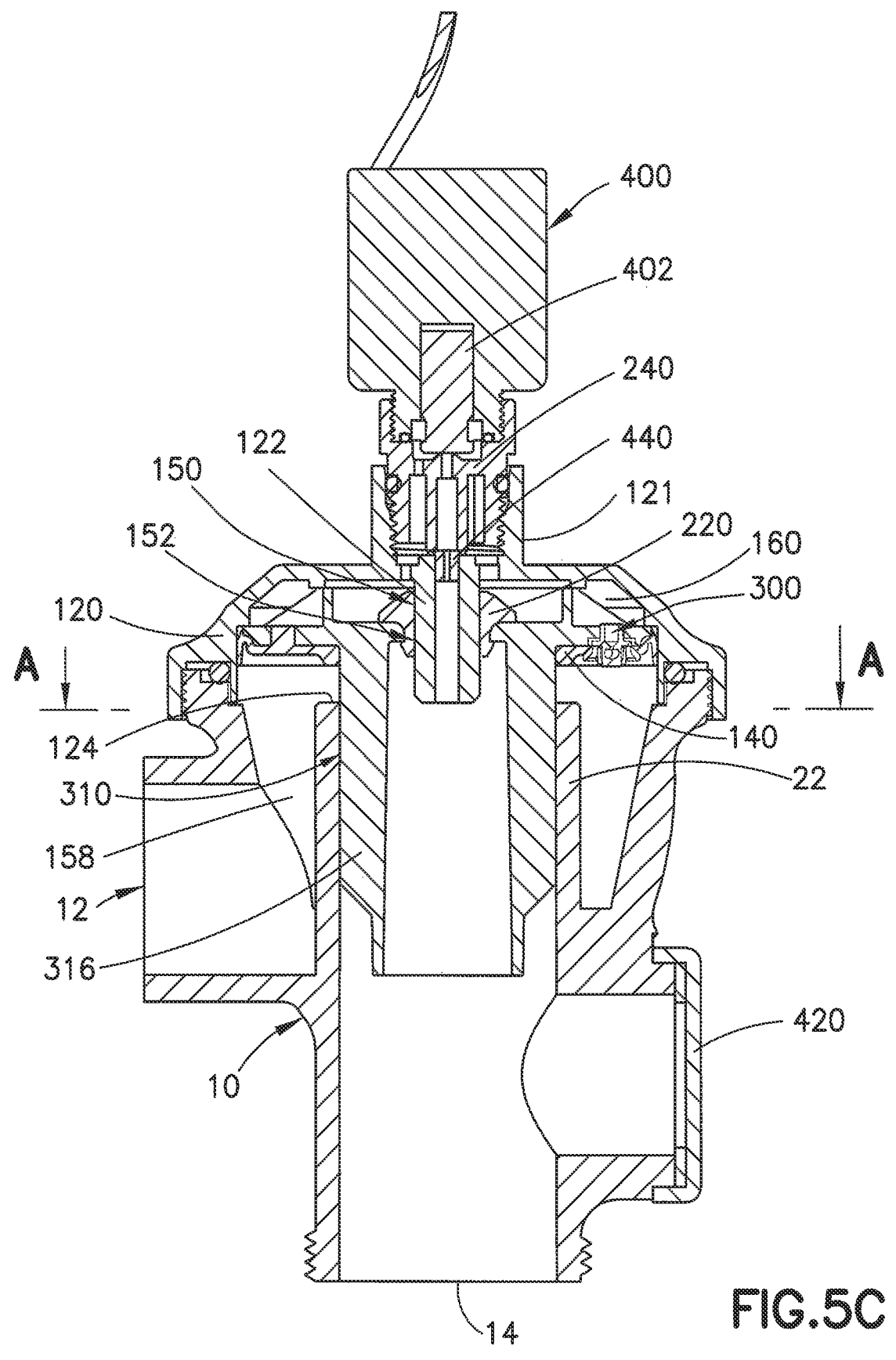

As shown in FIGS. 5A-5C, the cylindrical cap 120 includes a hollow stem 122 that extends down from the cap 120. In certain embodiments, the cylindrical cap 120 also includes a collar 121. The hollow stem 122 extends into the adapter 220 positioned in the rigid piston 310. Once placed into the adapter 220, the hollow stem 122 forms two seals with the adapter 220. A first seal 150 is formed between the hollow stem 122 and adapter 220 near the cylindrical cap 120, and a secondary seal 152 is formed between the hollow stem 122 and adapter 220 at a location below the first seal 150 (see FIG. 5C). This dual seal engagement prevents water in the upper chamber 160 from leaking between the hollow stem 122 and adapter 220 and into the fluid outlet 14.

In certain embodiments, as shown in FIGS. 5A-5C, a fitting 240, such as a bleed plug, can be used to connect a solenoid 400 to the flush valve 2. Referring to FIG. 3, the fitting 240 has a first end 242 and a second end 244. The first end 242 of the fitting 240 is connectable to the flush valve 2, such as to the collar 121 of the cap 120, and the second end 244 is configured to receive a solenoid 400. For instance, in certain embodiments as shown in FIG. 3, the first end 242 of the fitting 240 can have external threads and can be threadably connected to the collar 121 of the cap 120, and the second end 244 of the cap 120 can have internal threads to receive external threads on the solenoid 400.

As indicated above, in certain embodiments as shown in FIGS. 5A-5C, a solenoid 400 is attached to the fitting 240 that, in turn, is attached to the collar 121 of the cap 120. The solenoid 400 includes a solenoid plunger 402 that is slidable within the solenoid 400, as is conventional in many solenoids. The solenoid plunger 402 engages the inside portion of the fitting 240. The solenoid 400 allows the flush valve 2 to be controlled electronically, such as by a conventional push-button actuator. In certain embodiments, the solenoid 400 is activated by an infrared (IR) sensor. A radio frequency (RF) chip can also be built into the flush valve 2 for wireless communication with a controller. As such, the operating handle 26 assembly previously used is removed from the flush valve body 10. As shown in FIG. 3, a cover 420 such as a cap can be placed over the opening where the operating handle 26 assembly was removed. A sealing member 422, such as a washer, can be used with the cover 420.

Referring to FIG. 3, in certain embodiments, a flow restricting element 440 is positioned within the flush valve 2. The flow restricting element 440 controls the flow of water during operation. As shown in FIGS. 5A-5C, in certain embodiments, the flow restricting element 440 is positioned in the hollow stem 122 of the cap 120.

FIG. 5A shows the piston assembly according to one embodiment of the present invention incorporated into the valve body 10 while the flush valve 2 is in a closed steady-state position. The piston seal 140 attached to the rigid piston 310 engages the central valve seat 124 of the outlet bore 22. Water flowing into the fluid inlet 12 passes through the passageway 301 of the by-pass device 300, and into the upper chamber 160. Water is then channeled through a passage 123 in the cap 120, through cavities in the fitting 240, and up to the solenoid 400. Because the solenoid plunger 402 is in a sealed position within the fitting 240, water is not allowed to flow through the hollow stem 122 of the cap 120.

As shown in FIG. 5A, the adapter 220 and hollow stem 122 of the cap 120 close the opening in the center of the rigid piston 310 preventing water from entering the central opening 313. The pressure in the upper chamber 160 forces the piston 310 down onto the piston seal 140, which forces the piston seal 140 onto the central valve seat 124 forming a seal around the outlet bore 22 so that there is no fluid communication between the fluid inlet 12 and fluid outlet 14. Pressure from water flowing through the fluid inlet 12 causes the annular skirt 128, as shown in FIGS. 3-4, to extend outward onto the inside of the cylindrical cap 120, as shown in FIG. 3. This prevents water in the lower chamber 158 from entering the upper chamber 160.

In operation, as shown in FIG. 5B, when actuated, the solenoid plunger 402 lifts off the fitting 240. This allows water to flow through the flow restricting element 440 and hollow stem 121, thereby relieving pressure from the upper chamber 160. The solenoid 400 remains actuated for a set period of time. The set period of time and the flow restricting element 440 help control the amount of water that flows to the fluid outlet 14.

Referring to FIG. 5C, as pressure is relieved from the upper chamber 160, inlet water pressure forces the piston 310 to move axially upwards off of the central valve seat 124 in a direction opposite the fluid outlet 14. The guide members 316 attached to the elongated hollow member 308 of the rigid piston 310 ride along the inside wall of the outlet bore 22 maintaining proper alignment of the rigid piston 310 as it moves off the central valve seat 124.

During flushing, as shown in FIG. 5C, water flows directly from the fluid inlet 12 into the flow ring 314, which gauges the proper amount of volume to be flushed. The water then continues to the fluid outlet 14 in the direction shown by reference letter "A" in FIG. 5C. As the valve is flushing, the water pressure pushing the rigid piston 310 off the central valve seat 124 is continuing to act on the annular skirt 128 of the piston seal 140. This pressure pushes the annular skirt 128 out towards the cap 120 that is attached to the valve body 10. This maintains a seal between the lower chamber 158 and upper chamber 160 so that water can only enter the upper chamber 160 through the by-pass device 300. As discussed above, the hollow stem 122 forms two seals with the adapter 220. A first seal 150 is formed between the hollow stem 122 and adapter 220 near the cylindrical cap 120, and a secondary seal 152 is formed between the hollow stem 122 and adapter 220 at a location below the first seal 150. If the first seal 150 is broken, the secondary seal 152 maintains the sealing engagement between the hollow stem 122 and adapter 220.

As water flows from the inlet 12 into the outlet 14, water is also flowing through the by-pass device 300 into the upper chamber 160. When the water pressure in the upper chamber 160 is greater than the inlet 12 water pressure, the rigid piston 310 and piston seal 140 are forced back onto the central valve seat 124 in a steady axial motion with the help of the guide members 316 so that there is no fluid communication between the inlet 12 and outlet 14.

The present invention is also directed to a method of retrofitting a rigid piston 310 into a flush valve body 10. Referring to FIGS. 2-4, the method includes removing the outer cover 18 from the diaphragm flush valve 2, and then removing the diaphragm valve assembly and operating handle 26 assembly from the valve body 10. Next, the rigid piston 310 and piston seal 140 are attached to each other with the by-pass device 300 placed within by-pass orifices 312, 142 defined in the rigid piston 310 and piston seal 140. In one embodiment, a retaining ring 90, 290 is attached to the piston seal 140 and the by-pass device 300 is also placed within a by-pass orifice 92 defined in the retaining ring 90, 290.

The rigid piston 310 is axially mounted into the valve body 10 and onto the central valve seat 124 of the outlet bore 22. After mounting the rigid piston 310 into the valve body 10, the adapter 220 is incorporated into the rigid piston 310. The cylindrical cap 120 is attached to the valve body 10 at an end opposite the flow outlet 14 with the hollow stem 122 extending into the adapter 220. A sealing component 380, such as an O-ring, may also be placed into the flush valve body 10 with the cylindrical cap 120. Once placed into the adapter 220, the hollow stem 122 forms two seals with the adapter 220. In certain embodiments, a flow restricting element 440 is placed into the hollow stem 122. The first end 242 of a fitting 240, such as a bleed plug, is connected to the collar 121 of the cap 120. A solenoid 400 is then connected to the second end 244 of the fitting 240. Finally, a cover 420 can be placed over the opening where the operating handle 26 assembly was removed. A sealing member 422, such as a washer, can be used with the cover 420.

Accordingly, the present invention, which is directed to a rigid piston 310 incorporating a solenoid 400 that can be used in a conventional flush valve body 10, provides a more efficient flush that is electronically controlled. Because the by-pass orifice 312 is larger and the rigid piston 310 moves with a consistently steady axial movement, less water is used during the flush cycle. Further still, the present invention can easily be retrofitted into a conventional flush valve body 10 allowing for a fast and cheap installation process.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A rigid piston for use in a flush valve, comprising:
   a disc shaped member having a central opening, an elongated hollow member that is attached to and extends down from the disc shaped member, a by-pass orifice defined in the disc shaped member, an adapter positioned in the rigid piston and extending into the elongated hollow member, and a hollow stem that extends from a cap into the adapter, wherein the adapter engages and forms a seal with the rigid piston around the central opening in the disc shaped member to prevent water from leaking between the adapter and rigid piston, and wherein the hollow stem forms a dual seal engagement with the adapter that includes a first seal with the adapter proximate the cap and a second seal with the adapter a location below the first seal to prevent water from leaking between the hollow stem and the adapter.

2. The rigid piston of claim 1, further comprising:
   a by-pass device having a body with a first end, a second end, and a passageway positioned through the body, wherein the by-pass device is adapted to fit inside the by-pass orifice of the rigid piston.

3. The rigid piston assembly according to claim 2, further comprising:
   a retaining ring including a by-pass orifice, wherein the by-pass device is further placed within the by-pass orifice defined in the retaining ring.

4. The rigid piston of claim 1, wherein the flush valve has a valve body with a fluid inlet and a fluid outlet, wherein the cap is configured to connect to the valve body at an end opposite of the fluid outlet, and wherein the hollow stem extends from a central opening in the cap.

5. The rigid piston of claim 4, wherein the flush valve further comprises a flow restricting element positioned within the hollow stem of the cap.

6. The rigid piston of claim 4, further comprising:
   a piston seal, wherein the piston seal comprises a disc shaped body with a central opening and an annular skirt that is adapted to expand out toward the cap connected to the valve body and form a seal with the cap, and wherein the annular skirt extends around an outside perimeter of both the piston seal and the disc shaped member of the rigid piston.

7. The rigid piston of claim 6, wherein the piston seal is molded to the rigid piston.

8. The rigid piston of claim 6, wherein the piston seal further comprises a central sealing ring extending out from and surrounding an edge of the central opening.

9. The rigid piston of claim 1, wherein the rigid piston further comprises guide members that maintain an alignment of the rigid piston within the flush valve during operation.

10. The rigid piston of claim 1, further comprising:
    a flow ring that gauges the amount of water to be flushed during operation.

11. The rigid piston of claim 10, wherein the flow ring is attached to an outer surface of the elongated hollow member of the rigid piston.

12. The rigid piston of claim 1, wherein the adapter is molded to the rigid piston.

* * * * *